C. E. PIPER.
GALVANIC BATTERY.

No. 349,600. Patented Sept. 21, 1886.

Witnesses:
E. L. Thurston
Chas. E. Davis

Inventor.
Charles E. Piper
by Hill & Dixon
his attorneys.

UNITED STATES PATENT OFFICE.

CHARLES E. PIPER, OF MOLINE, ILLINOIS.

GALVANIC BATTERY.

SPECIFICATION forming part of Letters Patent No. 349,600, dated September 21, 1886.

Application filed January 28, 1886. Serial No. 190,123. (No model.)

*To all whom it may concern:*

Be it known that I, CHARLES E. PIPER, of Moline, in the county of Rock Island and State of Illinois, have invented certain new and useful Improvements in Galvanic Batteries, of which the following is a full, clear, and exact description, reference being had to the accompanying drawings, in which—

Figure 1:
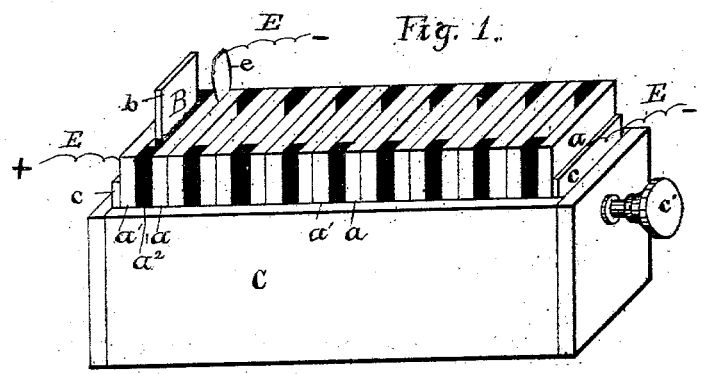
Figure 2:
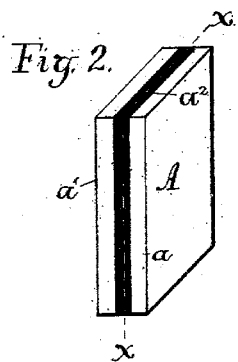
Figure 3:
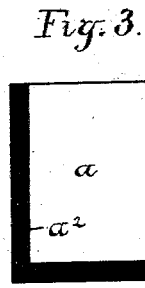
Figure 4:
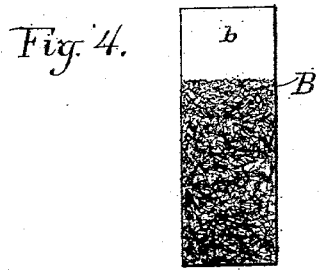

Figure 1 is a perspective view of my improved galvanic battery. Fig. 2 is a perspective view of one cell thereof turned bottom up. Fig. 3 is a sectional view on line $x$ $x$ in Fig. 2, and Fig. 4 is a view of the preferable form in which the chemical charge for a battery-cell is prepared.

My invention has for its object the production of a compact, powerful, and easily-operated battery for generating a galvanic current.

To this end it consists, first, in a cell or cells consisting of a positive and a negative plate cemented to a strip of insulating material which lies between them at or near the edges of three sides thereof, thereby forming a receptacle between them for retaining the electrolyte; second, in an electrolyte consisting of mercuric nitrate, either alone or combined with another nitrate to form a non-deliquescent salt; third, in the combination of a battery-cell as above described, combined with a fibrous slip having deposited thereon the electrolyte, and also in the other matters described and claimed herein.

My improved battery is a still-liquid battery, and is illustrated in the accompanying drawings, wherein A represents a single cell complete in itself without any containing vessel, and adapted to retain the electrolyte solution. This cell consists of a positive plate, $a$, and a negative plate, $a'$, which lie substantially parallel with each other, and are cemented to a strip of insulating material, $a^2$, which lies between them at or near the edges of three sides thereof. In the preferable form the positive element $a$ is of zinc, and the negative element $a'$ is of carbon, made liquid and acid proof by boiling it in paraffine, or any other suitable means. This form of battery-cell possesses many valuable features not found in any other form of cell known. It makes an extremely-compact cell. It is adapted to be connected with other cells like it, either in series multiple arc or series multiple, by simply placing the cells in contact with each other without the aid of any binding-posts, wires, or other devices—that is to say, the cells may be connected by placing the negative plates in contact with the positive plates, as shown in the drawings; or they may be connected by placing them so that their edges shall be in contact, the edge of each negative plate against the edge of the negative plate in the adjoining cells, and the edges of the positive plates in contact, or the two above-described methods may be combined.

When connected in series, as shown, a single cell or the whole number may be used, as desired, by only charging the cells it is desired to use, and completing the circuit by inserting a metallic wedge between the last cell in use and the next unused cell, and attaching the wire to said wedge, as shown in the drawings, wherein $e$ represents the metal wedge. Many different electrolyte solutions may be used with this form of cell; but I prefer to use mercuric nitrate, either alone or combined with some other nitrate which produces a non-deliquescent salt. I produce such a salt—a double nitrate of mercury and potassium—in the following manner: I take three equivalents of mercury and dissolve them in about ten equivalents of strong nitric acid by the aid of heat. When complete union has taken place, I add three equivalents of potassic nitrate and about two equivalents of nitric acid, and continue the heat until the solution is completely saturated. I have as a result a double nitrate of mercury and potassium, the salt of which, when dry, is non-deliquescent, whereas mercuric nitrate is deliquescent.

A solution of the above-described salt may be used as the electrolyte, or a solution of the nitrate of mercury, the action of both solutions being, as I believe, and so far as the production of the current is concerned, substantially the same. When either solution is used, a powerful current is generated, and very little polarization of the battery ensues, and the zinc is only slightly consumed. The current is chiefly produced by the electrolysis of the chemical. I cannot give the chemical reactions which take place during this electrolysis, but metallic mercury and a small quantity of zinc nitrate are found among the products. The freedom from polarization is, I believe, due to the weakness of the union of oxygen and nitrogen, and consequently the readiness with which oxygen is liberated to combine with any substance which might otherwise adhere to the plates.

Although, as stated, I may use the above-described chemicals in a solution simply, I prefer to prepare the charge for each cell as follows: I take a slip, B, of some fibrous material—such as blotting-paper, cloth, or the like—and dip it in the saturated solution of the double nitrate above described. The salt is deposited in crystals upon the fibrous slip, (which is some less in width than the width of the cell,) and the slip itself is changed by the action of the free acid in the solution into nitrocellulose, which is itself an electrolyte, which assists in the generation of the current. These slips, when dry, may be easily carried, ready for use; and the non-deliquescent quality of the double nitrate is here of signal advantage, since the slips will be always dry and clean. To generate a current, it is only necessary to place a slip in each cell which it is desired to use and add a sufficient quantity of water to fill or nearly fill the cell, and join the wires from the electrodes. The slip also serves another purpose than merely to carry the salt of the electrolyte conveniently. The electrolysis of the chemical occurs for most part in intimate connection with the slip B, and a great part of the products of the electrolysis is deposited upon said slip, instead of on the plates or the bottom of the cell. The slip thus serves to materially decrease the possibility of polarization. In order that the upper part, $b'$, of the slip may always remain dry and clean, I prevent the liquid from being absorbed by this part of the slip by dipping it in shellac or other material, to render it non-absorbent, before it is dipped in the concentrated solution of the electrolyte above described. The slip may thus be removed from the cell, when desired, without soiling the fingers.

C represents a box, which may be made of wood or other insulating material. At each end of the box I prefer to place the metal plates $c\ c$, to which the wires E E are attached. A screw, $c'$, at one end of the box screws against the plate $c$ at that end. The cells are placed in the box in series, as shown, in contact with each other, the positive plates all lying in one direction. The two plates at the ends of the series rest against the metal plates $c\ c$. The screw $c'$ is tightened, and it holds the cells in contact. By this arrangement each cell may be used interchangeably with every other cell, and no fixed order of the cells is necessary, and any change which may be desired, and for any purpose, may be made without trouble. I prefer to use as the insulating material between the plates forming each cell elastic rubber, because its elasticity enables the plates to form a more complete and regular contact when placed in the box, as above described. When it is desired to use less than the entire number of cells in the box, the metal wedge $e$, having a wire attached, is inserted between the last-charged cell and the next uncharged cell.

The above-described battery, while adapted to a variety of uses, is, by reason of its compactness, cleanliness, and constancy, especially suited to the requirements of the medical profession, who require a light, easily-managed battery, which will give for a short time a constant current of great electro-motive force. A battery having the charge deposited upon a slip of blotting-paper of about the size shown acts with constancy for from half to three-quarters of an hour. If a current is required for a longer time, it is the work of an instant only to renew the charge.

Having thus described my invention, what I claim as new, and desire to secure by Letters Patent, is—

1. A galvanic-battery cell consisting of two plates of different electrical potential, which lie substantially parallel with each other, and have their edges in line, said plates being cemented to a strip of insulating material which lies between them at or near the edges of three sides, thereby forming a receptacle between them, said plates being flat on their sides and edges, both of which are exposed, whereby electrical connection may be made with either or both plates of another like cell by simple contact of said cells, substantially as and for the purpose specified.

2. In a galvanic battery, two metal plates of different electrical potential cemented to a strip of insulating material which lies between them at or near the edges of three sides, thereby forming a receptacle, combined with a fibrous slip, and a suitable electrolyte deposited dry upon said slip, the whole being adapted to be set in operation by the addition of a sufficient quantity of water to fill or nearly fill said receptacle, and by completing the circuit, substantially as and for the purpose set forth.

3. As an electrolyte in a galvanic battery, mercuric nitrate.

4. As an electrolyte in a galvanic battery, a solution of mercuric nitrate combined with a salt (as potassic nitrate) which renders the combined salt non-deliquescent.

5. In a galvanic battery, a fibrous slip having one end made impervious to liquid, and having the chemical out of which the electrolyte solution is made deposited in a dry state upon the remaining portion thereof, substantially as and for the purpose set forth.

6. In a galvanic battery, the combination, with mercuric nitrate, of a salt (as potassic nitrate) which renders the combined salt non-deliquescent, and a fibrous slip upon which said combined salt is deposited in a dry state, for the purpose specified.

CHARLES E. PIPER.

Witnesses:
CHAS. G. CARLSON,
GUSTAF SWANSSON.